US011650358B2

(12) United States Patent
Suzuki

(10) Patent No.: US 11,650,358 B2
(45) Date of Patent: May 16, 2023

(54) OPTICAL FILM, OPTICAL BARRIER FILM, AND BACKLIGHT UNIT

(71) Applicant: TOPPAN PRINTING CO., LTD., Tokyo (JP)

(72) Inventor: Fumitake Suzuki, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 148 days.

(21) Appl. No.: 17/013,053

(22) Filed: Sep. 4, 2020

(65) Prior Publication Data

US 2020/0400864 A1 Dec. 24, 2020

Related U.S. Application Data

(63) Continuation of application No. PCT/JP2019/009150, filed on Mar. 7, 2019.

(30) Foreign Application Priority Data

Mar. 7, 2018 (JP) .............................. JP2018-040729

(51) Int. Cl.
*G02B 5/02* (2006.01)
*F21V 8/00* (2006.01)

(52) U.S. Cl.
CPC ......... *G02B 5/0242* (2013.01); *G02B 6/0051* (2013.01)

(58) Field of Classification Search
CPC .............................. G02B 6/005; G02B 6/0051
See application file for complete search history.

(56) References Cited

U.S. PATENT DOCUMENTS

| 5,852,514 A | 12/1998 | Toshima et al. |
| 10,732,331 B2 * | 8/2020 | Ludemann ............... G02B 1/111 |
| 2004/0105052 A1 * | 6/2004 | Uekita .................. G02B 5/0226 |
| | | 349/112 |
| 2012/0213967 A1 * | 8/2012 | Hosoda ................ G02B 5/0226 |
| | | 428/143 |

(Continued)

FOREIGN PATENT DOCUMENTS

| JP | 3790571 B2 | 6/2006 |
| JP | 2017-102389 A | 6/2017 |

OTHER PUBLICATIONS

International Searching Authority, "International Search Report," issued in connection with International Patent Application No. PCT/JP2019/009150, dated Jun. 4, 2019.

(Continued)

*Primary Examiner* — Eric T Eide
(74) *Attorney, Agent, or Firm* — Foley & Lardner LLP

(57) ABSTRACT

An optical film including a first film substrate, and a light diffusion layer that is formed on the first film substrate, wherein the light diffusion layer contains a binder resin and light-diffusing particles, of the light-diffusing particles, 10% or more by number of the light-diffusing particles form an uneven structure on a surface of the light-diffusing layer by the 10% or more of the light-diffusing particles protruding more than a surrounding area not containing any light-diffusing particles, and of the light diffusing particles which cause the binder resin to be protruded and have a protruded portion, 90% or more by number of the protruded portion of light-diffusing particles is covered by the binder resin.

8 Claims, 7 Drawing Sheets

(56) References Cited

U.S. PATENT DOCUMENTS

| | | | | |
|---|---|---|---|---|
| 2013/0264590 A1* | 10/2013 | Oh | ............................ | F21S 43/15 |
| | | | | 257/88 |
| 2014/0355125 A1* | 12/2014 | Boyd | ................... | G02B 6/0051 |
| | | | | 359/599 |
| 2015/0036379 A1* | 2/2015 | Lee | ......................... | G02B 6/005 |
| | | | | 362/606 |
| 2015/0300600 A1* | 10/2015 | Dubrow | ..................... | B32B 5/16 |
| | | | | 362/330 |
| 2017/0329066 A1* | 11/2017 | Harada | ................... | G02B 6/005 |

OTHER PUBLICATIONS

International Searching Authority, "Written Opinion," issued in connection with International Patent Application No. PCT/JP2019/009150, dated Jun. 4, 2019.

* cited by examiner

OPTICAL FILM, OPTICAL BARRIER FILM, AND BACKLIGHT UNIT

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/009150, filed on Mar. 7, 2019, which is based upon and claims the benefit of priority to Japanese Patent Application No. 2018-040729, filed on Mar. 7, 2018, the disclosures of which are all incorporated herein by reference in their entireties.

BACKGROUND

Technical Field

The present disclosure relates to an optical film provided to windows, displays, or the like. In particular, the present disclosure relates to a light diffusing optical film provided to displays such as liquid crystal displays (LCD), organic electroluminescence displays (ELD), and plasma displays (PDP), and an optical barrier film and a backlight unit including the optical film.

Background Art

In electronic devices such as liquid crystal displays, various optical films are used. PTL 1 describes an invention related to a light diffusion sheet used for lighting, illuminated signboards, rear projection screens, liquid crystal displays, or the like. The light diffusion sheet described in PTL 1 includes a light diffusion layer containing spherical particles of polymethyl methacrylate.

A surface of the light diffusion layer has fine asperities due to light-diffusing particles protruding from the layer mainly composed of a binder resin. The asperities on the surface are formed by single light-diffusing particles or a plurality of aggregated light-diffusing particles protruding from the surface. When used in a backlight unit, the light diffusion layer has a function of converting light emitted from a light source into a more uniform surface light source (diffuse illumination) and the like. When used in a display panel, the light diffusion layer has a function of preventing interference spots and preventing blocking (adhesion) and the like.

[Citation List] [Patent Literature] [PTL 1] JP 3790571 B

SUMMARY OF THE INVENTION

Technical Problem

After the production or during the production process of an optical film, when the light diffusion layer is the outermost surface, the protruding light-diffusing particles may be separated from the light diffusion layer and may become fine dust. Furthermore, when the protruding hard particles are in contact with a second member (e.g., a light guide plate facing the particles in the backlight unit), the particles may damage the second member.

The present disclosure has been made in view of the above problem. An object of the present disclosure is to provide an optical film, and an optical barrier film and a backlight unit provided with the optical film. The optical film is such that the risk of a light diffusion layer damaging a second member when in contact with the light diffusion layer and the risk of separation of light-diffusing particles are reduced.

Solution to Problem

In order to solve the above problem, an optical film according to an aspect of the present disclosure is an optical film including a first film substrate, and a light diffusion layer that is formed on the first film substrate, wherein the light diffusion layer contains a binder resin and light-diffusing particles, and of the light-diffusing particles, 10% or more by number of the light-diffusing particles forms an uneven structure on a surface of the light-diffusing layer by the 10% or more of the light-diffusing particles protruding more than a surrounding area not containing any light-diffusing particles, and of the light diffusing particles which cause the binder resin to be protruded and have a protruded portion, 90% or more by number of the protruded portion of light-diffusing particles is covered by the binder resin.

According to an aspect of the optical film, in the binder resin that covers the protruded portion of the light-diffusing particles, a thickness of the binder resin that covers a highest part of the protruded portion of the light-diffusing particles in a direction perpendicular to a plane determined by a boundary surface between the first film substrate and the light diffusion layer is in the range of 50 nm or more and 1 µm or less on average.

According to an aspect of the optical film, an average value of a height of the protruded portion of the light-diffusing particles from a plane determined by an average thickness of the light diffusion layer having the uneven structure is in the range of 10% or more and less than 50% of an average particle size of the light-diffusing particles in the light diffusion layer.

According to an aspect of the optical film, an average particle size of the light-diffusing particles in the light diffusion layer is in the range of 0.5 µm or more and 10 µm or less.

According to an aspect of the optical film, the light diffusion layer has a surface resistivity of $1.0\times10^{13}$ Ω/□ or less.

An optical barrier film according to an aspect of the present disclosure is an optical barrier film wherein, a surface comprising a second film substrate including an inorganic oxide layer is formed and a surface where the light diffusion layer is formed are on opposite sides of the first film substrate included in the optical film according to any one of claims 1 to 5, and the second film substrate is bonded to the first film substrate.

A backlight unit according to an aspect of the present disclosure includes the optical barrier film.

Advantageous Effects of the Invention

The present disclosure provides an optical film, and an optical barrier film and a backlight unit provided with the optical film. The optical film is such that the risk of a light diffusion layer damaging the second member when in contact with the light diffusion layer and the risk of separation of light-diffusing particles are reduced. Thereby, the production yield of these materials is improved, and productivity is increased.

BRIEF DESCRIPTION OF THE DRAWINGS

FIG. 7(a) illustrates the method of performing a pressure test, FIG. 7(b) illustrates the method of performing a falling ball test, and FIG. 7(c) illustrates the method of performing a scratch test.

DETAILED DESCRIPTION

Embodiments of the present invention of an optical film and an optical barrier film will be described below with reference to the drawings. In the following description of the drawings to be referred, components identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

[Optical Film]

Figure 1A:
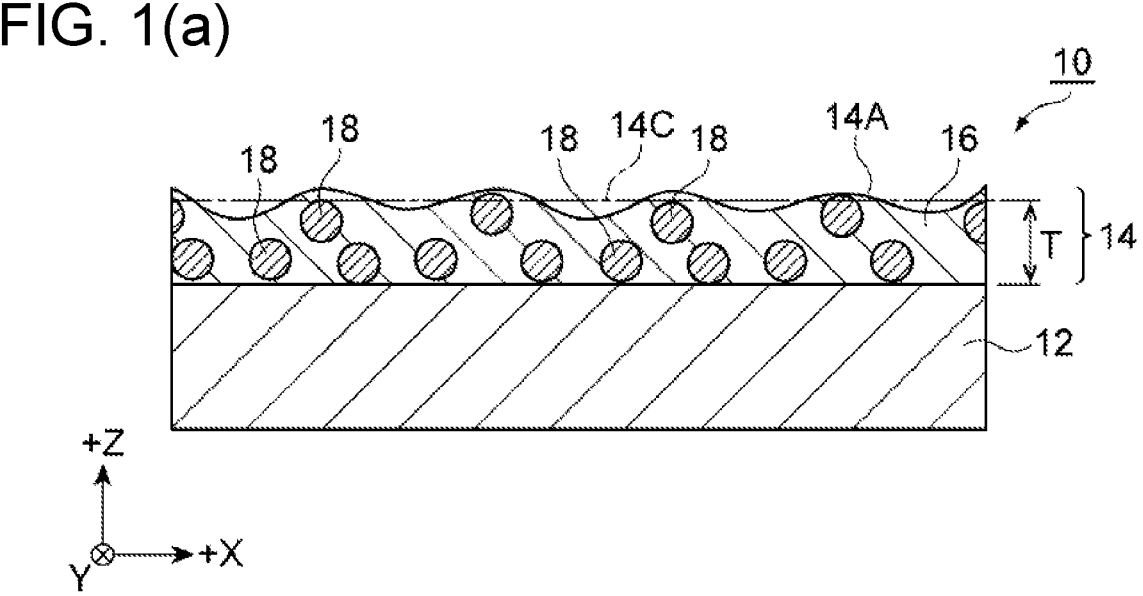
FIG. 1 (*a*) is a schematic cross-sectional view illustrating an optical film according to an embodiment of the present disclosure, and FIG. 1 (b) is a schematic cross-sectional view illustrating a characteristic of a preferable shape of the optical film of the present disclosure.
Figure 1B:
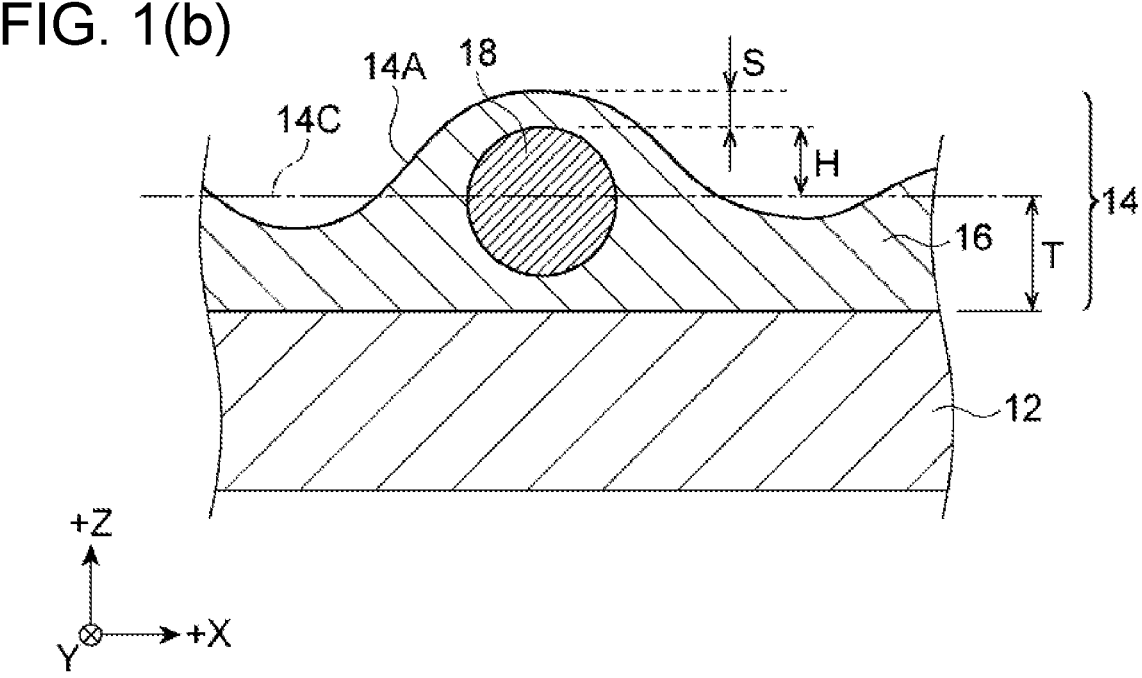

FIG. 1 (a) is a schematic cross-sectional view illustrating an optical film according to an embodiment of the present disclosure. FIG. 1 (a) shows an optical film 10 including a first film substrate 12 and a light diffusion layer 14 that is formed on the first film substrate 12. The light diffusion layer 14 contains a binder resin 16 and light-diffusing particles 18, and 10% or more of the number of light-diffusing particles 18 cause a portion of the light diffusion layer 14 to be protruded further outward than the surrounding area not containing any light-diffusing particles 18, to form an uneven structure on a surface of the light diffusion layer 14. Furthermore, of 90% or more by number of light-diffusing particles 18 which cause the binder resin 16 to be protruded and thus have protruded portions, the protruded portions are covered with the binder resin 16.

The term 10% or more of the number of light-diffusing particles 18 indicates 5 or more light-diffusing particles 18 out of at least 50 light-diffusing particles 18 are cross-sectionally observed using an optical microscope or an electron microscope. The term 90% or more by number of light-diffusing particles 18 having the protruded portion indicates 90% or more of 5 or more light-diffusing particles 18 in the above example.

FIG. 1 (b) is a schematic cross-sectional view illustrating a characteristic of a preferable shape of the optical film 10. In the optical film 10, the binder resin 16 covers the protruded portion of the light-diffusing particles 18. Of the binder resin 16, the binder resin 16 has a portion which covers the highest part of the protruded portion of the light-diffusing particle in a direction perpendicular (+Z direction) to a plane determined by a boundary surface between the first film substrate 12 and the light diffusion layer 14, and the portion has a thickness S of 50 nm or more and 1 μm or less on average. The average value of the thickness S is the average value obtained by measuring the thickness at 20 locations in the binder resin 16 covering the protruded portion of the light-diffusing particles 18 by cross-sectional observation using an optical microscope or an electron microscope.

If the average value of the thickness S is less than 50 nm, due to an insufficient covering effect, the risk that the light diffusion layer 14 may damage a second member when in contact with the light diffusion layer 14 and the risk that the light-diffusing particles 18 may be separated are higher. If the average value of the thickness S is more than 1 μm, unevenness of the surface becomes large. Thus, optical characteristics such as haze may deviate from the optimum value.

Furthermore, in the optical film 10, an average value of a height H of the protruded portion of the light-diffusing particles 18 from a plane 14C determined by an average thickness T of the light diffusion layer 14 having the uneven structure is preferably in the range of 10% or more and less than 50% of an average particle size R of the light-diffusing particles 18 in the light diffusion layer 14. The average thickness T of the light diffusion layer 14 having the uneven structure can be obtained by using an electronic micrometer or a fully automatic fine shape measuring device. The average value of the height H is the value obtained by measuring the height H of the protruded portion of the light-diffusing particles 18 at 20 locations by cross-sectional observation using an optical microscope or an electron microscope.

The average particle size R of the light-diffusing particles 18 in the light diffusion layer 14 can be obtained, for example, by enlarging and observing a surface of the optical film 10 using an optical microscope or an electron microscope. For example, in 20 randomly selected light-diffusing particles 18, diameters (Rx, Ry) in a lateral (X) direction and a longitudinal (Y) direction are measured, and the average value (=(Rx+Ry)/2) is determined for each of the light-diffusing particles 18. Then, the values for the 20 light-diffusing particles 18 are averaged to obtain the average particle size R.

If the height H of the protruded portion of the light-diffusing particles 18 is less than 10% of the average particle size R, a suitable haze value is not obtained. If the height H is more than 50%, due to insufficient covering of the protruded portion by the binder resin, the risk that the light diffusion layer 14 may damage the second member when it is in contact with the light diffusion layer and the risk that the light-diffusing particles 18 may become detached are higher.

Furthermore, in the optical film 10, the average particle size R of the light-diffusing particles 18 in the light diffusion layer 14 is preferably in the range of 0.5 μm or more and 10 μm or less. If the average particle size R is less than 0.5 μm, a suitable haze value is not obtained. If the average particle size R is more than 10 μm, the light diffusion layer 14 may damage the second member when it is in contact with the light diffusion layer 14.

Furthermore, in the optical film 10, the light diffusion layer 14 preferably has a surface resistivity of $1.0 \times 10^{13}$ Ω/□ or less. When the surface resistance of the light diffusion layer 14 is $1.0 \times 10^{13}$ Ω/□ or less, the light diffusion layer 14 has suitable antistatic properties, and thus dust or the like is less likely to be adhered to or mixed in the light diffusion layer 14. Therefore, in the production process of a backlight unit or the like, damage to the light diffusion layer 14 or the second member due to dust is less likely to occur.

[Optical Barrier Film]

First Embodiment

Figure 2:
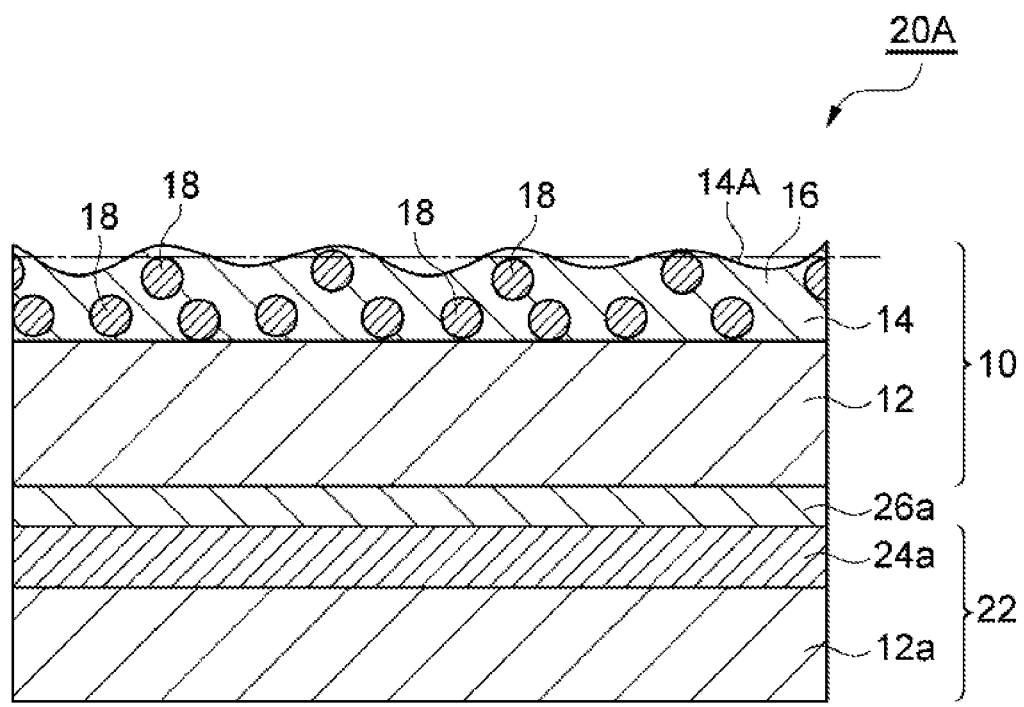
FIG. 2 is a schematic cross-sectional view illustrating an optical barrier film according to a first embodiment of the present disclosure.

FIG. 2 is a schematic cross-sectional view illustrating an optical barrier film according to a first embodiment of the present disclosure. FIG. 2 shows an optical barrier film 20A provided with a barrier composite layer 22 including a second film substrate 12a and a barrier layer 24a, and the optical film 10 shown in FIG. 1 (a). The barrier composite layer 22 is formed on the optical film 10 via an adhesive layer 26a in such a manner that the first film substrate 12 and the barrier layer 24a face each other.

Since the optical barrier film 20A is provided with the barrier composite layer 22 including the second film substrate 12a and the barrier layer 24a, it is possible to implement an optical barrier film that has good water vapor barrier properties and oxygen barrier properties and allows further reduction in damage to the barrier layer or the like. The second film substrate 12a may be formed of the same material as that of the first film substrate 12. The second film substrate 12a preferably has a thickness, for example, in the range of 5 μm or more and 50 μm or less. When the thickness of the second film substrate 12a is 5 μm or more, the strength of the second film substrate 12a may be improved, and thus, for example, the second film substrate 12a may tend to be handled easier in the process or the like of producing a backlight. When the thickness of the second film substrate 12a is 50 μm or less, deterioration of the barrier properties can be prevented, which would otherwise be caused by the entry of water vapor or oxygen from the end faces of the substrate.

The barrier layer 24a is capable of blocking the entry of gas. The barrier layer 24a preferably includes a thin inorganic layer. The thin inorganic layer preferably contains an inorganic oxide such as a metal oxide. Examples of the metal include aluminum, copper, and silver. The metal oxide may be, for example, at least one metal oxide selected from the group consisting of yttrium tantalum oxide, aluminum oxide, silicon oxide, magnesium oxide, and the like. Of these oxides, silicon oxide is preferable due to its low cost and high barrier properties of blocking the entry of water vapor or the like. The silicon oxide is expressed by SiOx, where x is preferably in the range of 1.5 or more and 2.0 or less. When x is 1.5 or more, or preferably 1.7 or more, the transparency tends to improve. When x is 2.0 or less, the barrier properties tend to improve. The thin inorganic layer is formed, for example, by vapor deposition or sputtering. Preferably, the thin inorganic layer may be formed by vapor deposition.

The thin inorganic layer preferably has a thickness in the range of 10 nm to 300 nm, and more preferably 20 nm to 100 nm. When the thickness of the thin inorganic layer is 10 nm or more, a uniform film is more likely to be obtained, and gas barrier properties are more likely to be obtained. When the thickness of the thin inorganic layer is 300 nm or less, the thin inorganic layer can maintain flexibility, and thus cracking or the like is less likely to occur in the layer, after being formed, due to external forces such as bending or pulling.

The barrier layer 24a may include a gas barrier coating layer. The gas barrier coating layer is preferably formed of a composition containing at least one selected from the group consisting of a metal alkoxide expressed by the following formula (1) and a hydrolysate thereof.

$$M(OR^1)_m(R^2)_{n-m} \quad (1)$$

In formula (1), $R^1$ and $R^2$ are each independently a monovalent organic group having 1 to 8 carbon atoms, and are preferably an alkyl group such as a methyl group or an ethyl group. M represents an n-valent metal atom such as Si, Ti, Al, or Zr. Furthermore, m represents an integer from 1 to n. Examples of the metal alkoxide include tetraethoxysilane $[Si(OC_2H_5)_4]$ and triisopropoxyaluminum $[Al(O\text{-}iso\text{-}C_3H_7)_3]$. The metal alkoxide is preferably tetraethoxysilane or triisopropoxyaluminum which is relatively stable in aqueous solvent after being hydrolyzed. Examples of the hydrolysate of the metal alkoxide include silicic acid $(Si(OH)_4)$ which is a hydrolysate of tetraethoxysilane, and aluminum hydroxide $(Al(OH)_3)$ which is a hydrolysate of tripropoxyaluminum. These may be used singly or in a combination of two or more.

The composition may further contain a hydroxyl group-containing polymer compound. Examples of the hydroxyl group-containing polymer compound include water-soluble polymers such as polyvinyl alcohol, polyvinyl pyrrolidone, and starch. From the viewpoint of barrier properties, the hydroxyl group-containing polymer compound is preferably polyvinyl alcohol. These may be used singly or in a combination of two or more. The content of hydroxyl group-containing polymer compound in the composition is, for example, in the range of 10 to 90 mass %.

The gas barrier coating layer preferably has a thickness in the range of 50 nm to 1,000 nm, and more preferably 100 nm to 500 nm. When the thickness of the gas barrier coating layer is 50 nm or more, more sufficient gas barrier properties tend to be obtained, and when the thickness of the gas barrier coating layer is 1,000 nm or less, sufficient flexibility tends to be maintained.

If the barrier layer 24a includes both the thin inorganic layer and the gas barrier coating layer, the thin inorganic layer may be formed on the surface of the first film substrate 12, and the gas barrier coating layer may be formed on the surface of the thin inorganic layer.

The adhesive layer 26a is formed of an adhesive or a tackifier. The adhesive may be an acrylic adhesive, an epoxy adhesive, a urethane adhesive, or the like. The adhesive preferably contains an epoxy resin. When the adhesive contains an epoxy resin, adhesion between the optical film 10 and the barrier composite layer 22 is improved. The tackifier may be an acrylic tackifier, a polyvinyl ether tackifier, a urethane tackifier, a silicone tackifier, a starch paste adhesive, or the like. The adhesive layer 26a preferably has a thickness in the range of 0.5 μm to 50 μm, more preferably 1 μm to 20 μm, and even more preferably 2 μm to 6 µm. When the thickness of the adhesive layer 26a is 0.5 µm or more, adhesion between the optical film 10 and the composite barrier layer 22 tends to be easily obtained, and when 50 µm or less, better gas barrier properties tend to be easily obtained.

The optical barrier film 20A according to the first embodiment is obtained by, for example, forming a barrier layer 24a on a second film substrate 12a to produce a barrier composite layer 22 separately from the optical film 10, and then bonding the optical film 10 and the barrier composite layer 22 together, followed by aging as necessary. The method of producing the optical barrier film 20A according to the first embodiment is not limited to the above method.

Second Embodiment

Figure 3:
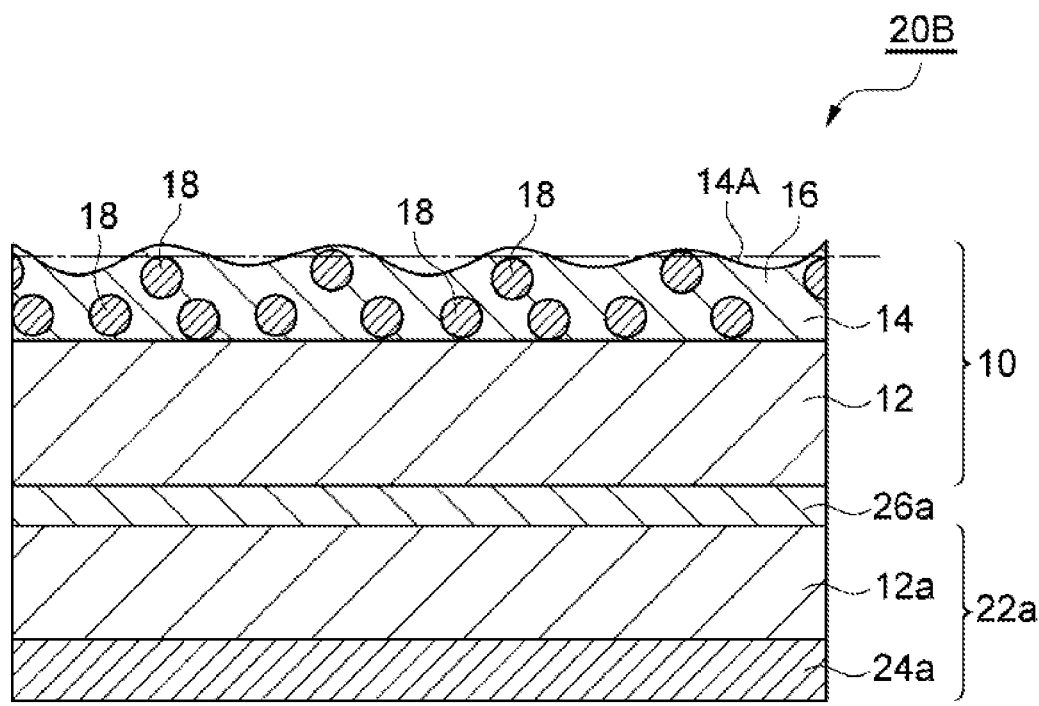
FIG. 3 is a schematic cross-sectional view illustrating an optical barrier film according to a second embodiment of the present disclosure.

FIG. 3 is a schematic cross-sectional view illustrating an optical barrier film according to a second embodiment of the present disclosure. FIG. 3 shows an optical barrier film 20B provided with a barrier composite layer 22a including the second film substrate 12a and the barrier layer 24a, and the optical film 10. The barrier composite layer 22a is formed on the optical film 10 via the adhesive layer 26a in such a manner that the first film substrate 12 and the second film substrate 12a face each other.

Third Embodiment

Figure 4:
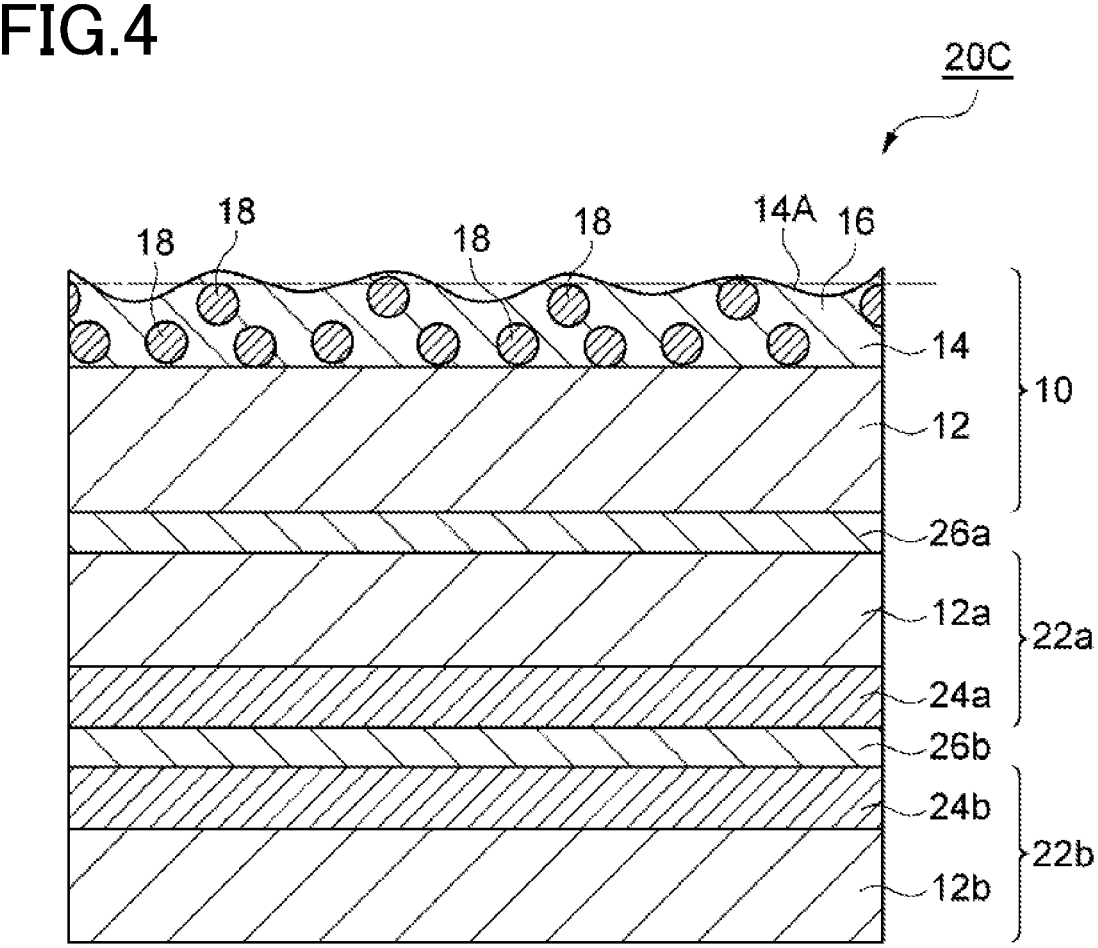
FIG. 4 is a schematic cross-sectional view illustrating an optical barrier film according to a third embodiment of the present disclosure.

FIG. 4 is a schematic cross-sectional view illustrating an optical barrier film according to a third embodiment of the present disclosure. FIG. 4 shows an optical barrier film 20C provided with the barrier composite layer 22a including the second film substrate 12a and the barrier layer 24a, a barrier composite layer 22b including a third film substrate 12b and a barrier layer 24b, and the optical film 10. The barrier composite layer 22a is formed on the optical film 10 via the adhesive layer 26a in such a manner that the first film substrate 12 and the second film substrate 12a face each other. The barrier composite layer 22b is formed on the barrier composite layer 22a via an adhesive layer 26b such that the barrier layer 24a and the barrier layer 24b face each other.

[Color Conversion Film]

Figure 5:
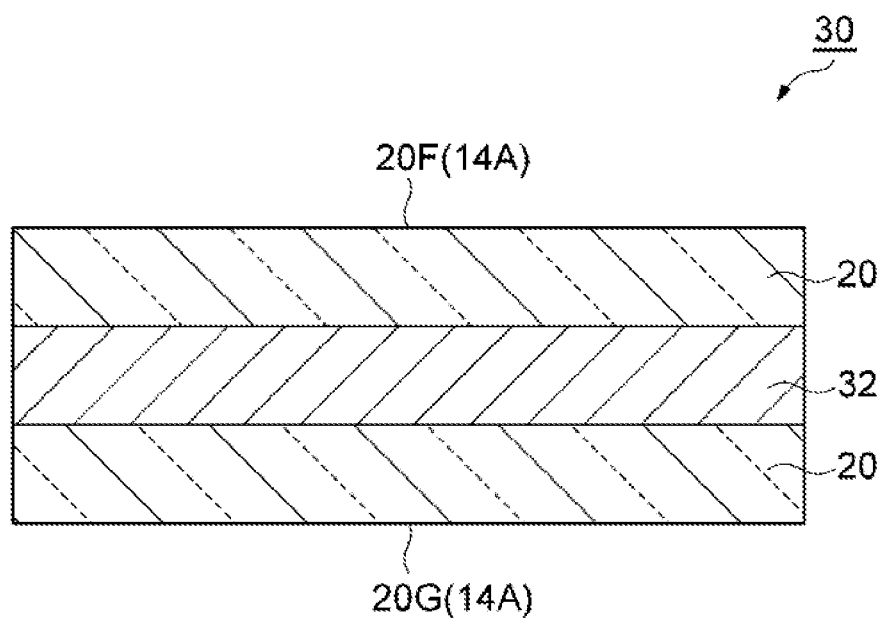
FIG. 5 is a schematic cross-sectional view illustrating a color conversion film including an optical barrier film according to an embodiment of the present disclosure.

FIG. 5 is a schematic cross-sectional view illustrating a color conversion film provided with an optical barrier film according to an embodiment of the present disclosure. A color conversion film 30 is capable of converting the wavelength of part of light emitted from a light source of a backlight unit for a liquid crystal display. FIG. 5 shows the color conversion film 30 including a color conversion layer 32, and optical barrier films 20 that are disposed to sandwich the color conversion layer 32. Each optical barrier film 20 may be any one of the optical barrier films 20A, 20B, and 20C described above. The two optical barrier films 20 may have the same structure or may have different structures. Each optical barrier film 20 is disposed on the color conversion layer 32 such that the light diffusion layer 14 faces away from the color conversion layer 32. Thus, the color conversion film 30 has uneven surfaces 20F and 20G each derived from an uneven surface 14A of the light diffusion layer 14.

Since the uneven surfaces 20F and 20G are provided on the surfaces of the color conversion film 30, when the second member is overlapped on the uneven surface 20F or 20G of the color conversion film 30, blocking with the second member is minimized. In addition, even when the color conversion film 30 is overlapped, for example, on a light guide constituting the backlight unit, the light guide can be prevented from being damaged by the protruding light-diffusing particles. Further, since the barrier layer itself is also prevented from being damaged, the entry of air or water vapor into the color conversion layer 32 is appropriately reduced. Thus, color conversion performance of the color conversion film 30 is maintained over a long period of time.

The color conversion film according to the present disclosure should not be limited to the above embodiments. Although FIG. 5 shows an example of the color conversion film 30 with a structure in which the color conversion layer 32 is sandwiched between two protective films composed of the optical barrier film according to the present disclosure, one of the two protective films sandwiching the color conversion layer 32 may be the optical barrier film according to the present disclosure, and the other may be a protective film with a different structure.

The color conversion layer 32 contains a resin and phosphors, and has a thickness of several tens to several hundreds of µm. The resin may be, for example, a photocurable resin or a thermosetting resin. The color conversion layer 32 preferably contains two kinds of phosphors composed of luminescent nanocrystals (quantum dots). The color conversion layer 32 may be a laminate of two or more phosphor layers each containing a different kind of phosphor. For the two kinds of phosphors, ones having the same excitation wavelength are selected. The excitation wavelength is determined based on the wavelength of light emitted from the light source of the backlight unit. The two kinds of phosphors have different fluorescent colors. When a blue light emitting diode (blue LED) is used as the light source, the two kinds of fluorescent colors are red and green. The wavelength of fluorescence of each phosphor and the wavelength of light emitted from the light source are determined based on the spectral characteristics of the color filter. The peak wavelength of the fluorescence is, for example, 610 nm for red and 550 nm for green.

[Backlight Unit]

Figure 6:
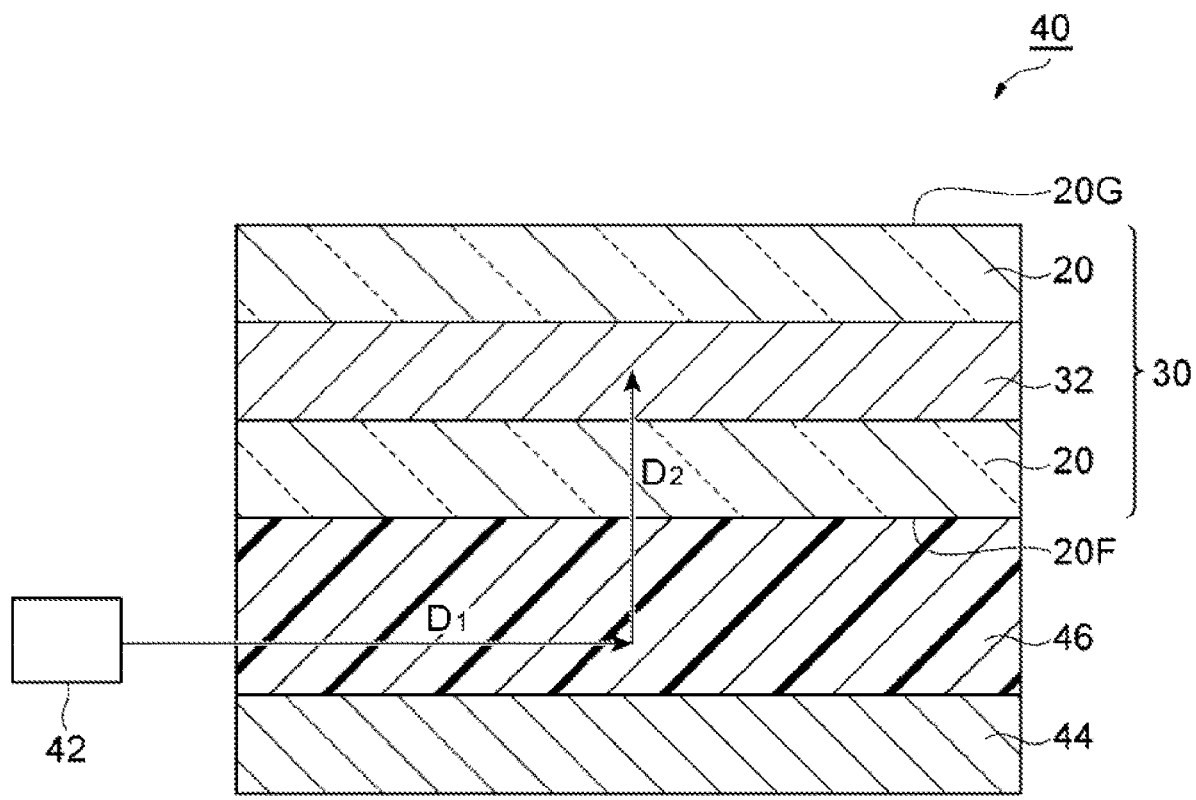
FIG. 6 is a schematic cross-sectional view illustrating a backlight unit according to an embodiment of the present disclosure.

FIG. 6 is a schematic cross-sectional view illustrating a backlight unit according to an embodiment of the present disclosure. FIG. 6 shows a backlight unit 40 including a light source 42, a light guide plate 46, and the color conversion film 30 disposed on the light guide plate 46. The color conversion film 30 is disposed so that the uneven surface 20F (i.e. the uneven surface 14A of the light diffusion layer 14) is in contact with the light guide plate 46. Specifically, in the backlight unit 40, the light guide plate 46 and a reflecting plate 44 are placed in this order on the uneven surface 20F of the color conversion film 30, and the light source 42 is disposed beside the light guide plate 46 (toward the face of the light guide plate 46). Since the backlight unit 40 includes the color conversion film 30 having a performance with sufficiently small in-plane variation, the variation of performance (coloring, luminance, etc.) of the backlight unit 40 can be sufficiently reduced. The backlight unit 40 can prevent damage to the light guide plate 46 contacting the color conversion film 30. Since the barrier layer itself is also prevented from being damaged, the entry of air or water vapor into the color conversion layer is appropriately reduced. Thus, good white light is provided by the backlight unit over a long period of time.

The light guide plate 46 and the reflecting plate 44 play a role of efficiently reflecting and guiding light emitted from the light source 42. Known materials may be used for these components. Examples of the material of the light guide plate 46 include acrylic films, polycarbonate films, and cycloolefin films. Materials used for the light guide plate 46 are unlikely to have high hardness and thus tend to be damaged through contact with the second member. Polycarbonate, in particular, which is generally used for light guide plates because of its high transparency and ease of processing, has low surface hardness and is easily damaged. The light source 42 includes, for example, a plurality of blue light emitting diode elements. The light emitting diode elements may be violet light emitting diodes, or may be light emitting diodes with an even lower wavelength. The light emitted from the light source 42 enters the light guide plate 46 (direction D1), and then enters the color conversion layer 32 (direction D2) with reflection and refraction. The light before passing through the color conversion layer 32 is mixed with yellow light generated in the color conversion layer 32, and thus the light that has passed through the color conversion layer 32 becomes white light.

Examples

The optical film according to the present disclosure will be more specifically described by way of examples and comparative examples. However, the scope of the present invention should not be limited to the following examples.

(Components to be Used)

The following components were used for preparing light diffusion layer compositions (coating liquids) of Examples 1 to 13 and Comparative Examples 1 and 2.

Main resin 1: Admixture (manufactured by DIC Graphics Corporation) of urethane fine particles (particle size: 2.5 to 3.5 μm) and a transparent material Main resin 2: Admixture (manufactured by DIC Graphics Corporation) of urethane fine particles (particle size: 10 to 15 μm) and a transparent material Transparent material: Varnish (manufactured by DIC Graphics Corporation) for adjusting concentration of the fine particles of the main resins 1 and 2

Hardener: Isocyanate curing agent (manufactured by DIC Graphics Corporation)

Antistatic agent: Resistat PU-101 (trade name, manufactured by DKS Co., Ltd.)

Solvent: Toluene (manufactured by Wako Pure Chemical Industries, Ltd., Cica first grade)

(Preparation of Optical Film)

A light diffusion layer composition obtained by mixing the materials shown in Table 1 was applied onto a first film substrate to form a coating film using a wire bar coater. Then, the coating film was heated at 80° C. for 30 seconds for drying. The dried coating film was aged at 60° C. for 2 days. In this manner, the optical films for Examples 1 to 13 and Comparative Examples 1 and 2 were prepared. When forming a coating film of the light diffusion layer composition, the coating amount was varied by using wire bars with different numbers (diameters) and adjusting the viscosity so that light diffusion layers with different thicknesses were formed on the respective first film substrates.

TABLE 1

| | Material composition (g) | | | | | | | Viscosity (Pa·s) |
|---|---|---|---|---|---|---|---|---|
| | Main resin 1 | Main resin 2 | Transparent material | Hardener | Antistatic agent | Solvent | Total | |
| Example 1 | 13.20 | — | 14.79 | 1.36 | 0.99 | 19.66 | 50.00 | 16 |
| Example 2 | 16.63 | — | 18.62 | 1.71 | 1.25 | 11.79 | 50.00 | 18 |
| Example 3 | 7.39 | — | 8.28 | 0.76 | 0.56 | 30.01 | 50.00 | 13 |
| Example 4 | 13.20 | — | 14.79 | 1.36 | 0.99 | 19.66 | 50.00 | 16 |
| Example 5 | 13.20 | — | 14.79 | 1.36 | 0.99 | 19.66 | 50.00 | 16 |
| Example 6 | — | 13.20 | 14.79 | 1.36 | 0.99 | 19.66 | 50.00 | 16 |
| Example 7 | — | 13.20 | 14.79 | 1.36 | 0.99 | 19.66 | 50.00 | 16 |
| Example 8 | 13.20 | — | 14.79 | 1.36 | — | 19.66 | 49.01 | 16 |
| Example 9 | — | 13.20 | 14.79 | 1.36 | — | 19.66 | 49.01 | 16 |
| Example 10 | — | 13.20 | 14.79 | 1.36 | — | 19.66 | 49.01 | 16 |
| Example 11 | — | 7.39 | 8.28 | 0.76 | — | 33.01 | 49.44 | 13 |
| Example 12 | 13.20 | — | 14.79 | 1.36 | — | 19.66 | 49.01 | 16 |
| Example 13 | — | 13.20 | 14.79 | 1.36 | 0.99 | 19.66 | 50.00 | 16 |
| Comparative Example 1 | 7.39 | — | 8.28 | 0.76 | 0.56 | 33.01 | 50.00 | 13 |
| Comparative Example 2 | 13.20 | — | 14.79 | 1.36 | 0.99 | 19.66 | 50.00 | 16 |

(Measurement of Characteristic Values of Optical Film)

The following characteristic values of the optical films obtained in the examples and the comparative examples were measured.

(1) Percentage of the number of light-diffusing particles having a protruded portion (2) Average value of thickness of a portion covering the highest part of the protruded portion of the light-diffusing particles (3) Average value of height of the protruded portion of the light-diffusing particles from the plane determined by the average thickness of the light diffusion layer (4) Average particle size of the light-diffusing particles in the light diffusion layer, and surface resistivity of the light diffusion layer The characteristic values other than the surface resistivity were measured by observing a cross section of the light diffusion layer at an arbitrary portion of the film using an electron microscope. Specifically, the percentage of the number of light-diffusing particles having the protruded portion was calculated by randomly selecting 50 light-diffusing particles and counting the number of light-diffusing particles having the protruded portion and the number of light-diffusing particles having no protruded portion among the 50 light-diffusing particles. It was confirmed that in all of the optical films of the examples and the comparative examples, 10% or more of the number of light-diffusing particles had a portion protruding above the surrounding area where there were no light-diffusing particles. Among the light-diffusing particles having the protruded portion, the percentage of the number of light-diffusing particles having the protruded portion covered with the binder resin was 100% in the optical films of all the examples, and 0% in the optical films of all the comparative examples. The average value of the thickness of a portion covering the highest part of the protruded portion of the light-diffusing particle was measured for randomly extracted 20 light-diffusing particles having the protruded portion covered with the binder resin. The average value of the height of the protruded portion of the light-diffusing particles from the plane determined by the average thickness of the light diffusion layer, and the average particle size of the light-diffusing particles in the light diffusion layer were each measured for randomly selected 20 light-diffusing particles which were protruded.

The surface resistivity of the light diffusion layer was measured based on JIS-K6911 (applied voltage: 500 V, time: 10 seconds, probe: URS, under environment of 23° C. and 55% RH) using a high-resistance resistivity meter (trade name: Hiresta-UP MCP-HT 450, manufactured by Dia Instruments Co., Ltd.).

Table 2 shows the following values.

Value 1: Proportion (unit: %) of the light-diffusing particles having a protruded portion Value 2: Of the thickness of the binder resin covering the protruded portion of the light-diffusing particles, an average value of thickness (unit: nm or μm) for the binder resin covering the highest part of the protruded portion of the light-diffusing particles in the direction perpendicular to the plane determined by the boundary surface between the first film substrate and the light diffusion layer Value 3: Proportion (unit: %) of the average value of the height of the protruded portion of the light-diffusing particles from the plane determined by the average thickness of the light diffusion layer having the uneven structure, to the average particle size of the light-diffusing particles in the light diffusion layer Value 4: Average particle size (unit: μm) of the light-diffusing particles in the light diffusion layer Value 5: Surface resistivity (unit: Ω/□) of the light diffusion layer

TABLE 2

| | Value 1 | Value 2 | Value 3 | Value 4 | Value 5 |
|---|---|---|---|---|---|
| Example 1 | 100% | 700 nm | 30% | 3 μm | $1.0 \times 10^{10}$ Ω/□ |
| Example 2 | 100% | 1.5 μm | 30% | 3 μm | $1.0 \times 10^{10}$ Ω/□ |
| Example 3 | 100% | 30 nm | 30% | 3 μm | $1.0 \times 10^{10}$ Ω/□ |
| Example 4 | 100% | 100 nm | 55% | 3 μm | $1.0 \times 10^{10}$ Ω/□ |
| Example 5 | 100% | 700 nm | 5% | 3 μm | $1.0 \times 10^{10}$ Ω/□ |
| Example 6 | 100% | 700 nm | 30% | 10 μm | $1.0 \times 10^{10}$ Ω/□ |
| Example 7 | 100% | 700 nm | 30% | 15 μm | $1.0 \times 10^{10}$ Ω/□ |
| Example 8 | 100% | 700 nm | 30% | 3 μm | $1.0 \times 10^{14}$ Ω/□ |
| Example 9 | 100% | 30 nm | 55% | 15 μm | $1.0 \times 10^{14}$ Ω/□ |
| Example 10 | 100% | 700 nm | 55% | 15 μm | $1.0 \times 10^{14}$ Ω/□ |
| Example 11 | 100% | 30 nm | 30% | 15 μm | $1.0 \times 10^{14}$ Ω/□ |
| Example 12 | 100% | 30 nm | 55% | 3 μm | $1.0 \times 10^{14}$ Ω/□ |
| Example 13 | 100% | 30 nm | 55% | 15 μm | $1.0 \times 10^{10}$ Ω/□ |
| Comparative Example 1 | 0% | — | 30% | 3 μm | $1.0 \times 10^{10}$ Ω/□ |
| Comparative Example 2 | 0% | — | 55% | 3 μm | $1.0 \times 10^{10}$ Ω/□ |

(Evaluation of Light Guide Plate Damage-Production Property)

Figure 7A:
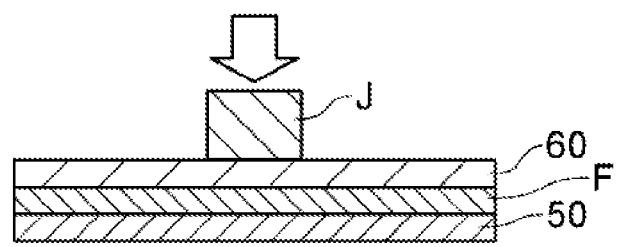
FIGS. 7(a) to 7(c) are each a schematic cross-sectional view illustrating a method of performing a test for evaluating a light guide plate damage-production property.
Figure 7B:
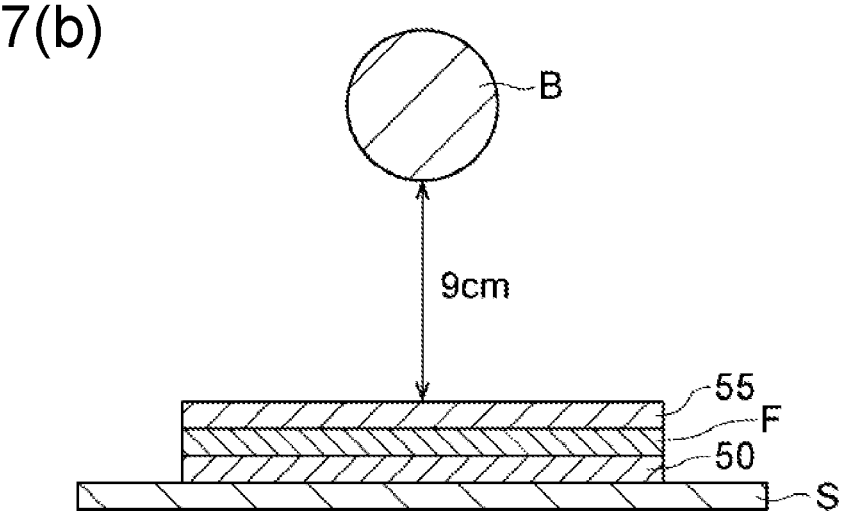
Figure 7C:
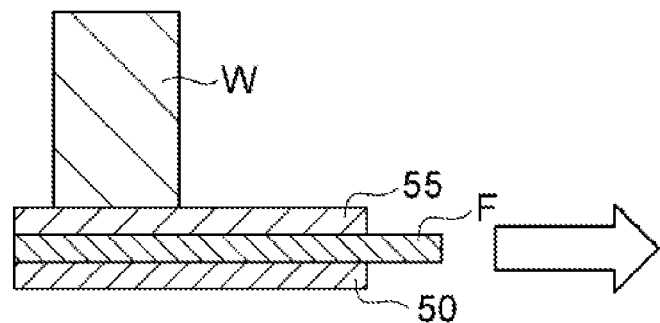

FIGS. 7 (a) to 7 (c) are each a schematic cross-sectional view illustrating a method of performing a test for evaluating a light guide plate damage-production property. FIG. 7 (a) illustrates the method of performing a pressure test, FIG. 7 (b) illustrates the method of performing a falling ball test, and FIG. 7 (c) illustrates the method of performing a scratch test. FIGS. 7 (a) to 7 (c) show an optical film F to be evaluated. Below the optical film F, a polycarbonate film 50 (thickness: 30 μm) was disposed as a simulated light guide plate of a backlight unit. The tests will be described below.

(a) Pressure Test

The optical film F (4 cm in length×4 cm in width) to be evaluated was prepared. The optical film F was disposed on the surface of the polycarbonate film 50. The optical film F was placed on the surface of the polycarbonate film 50 such that the light diffusion layer of the optical film F faced the polycarbonate film 50. A silicone rubber sheet 60 was disposed on the surface of the optical film F. While a load was applied to the optical film F using a jig J (base area: 1 cm²), the optical film F was left for 30 seconds at room temperature with a load of 25 kgf/cm². After that, the surfaces of the optical light diffusion layer and the polycarbonate film were observed both visually and using an optical microscope to evaluate the presence or absence of damage and the state of damage.

(b) Falling Ball Test

The optical film F to be evaluated was sandwiched between the polycarbonate film 50 as the simulated light guide plate and a polycarbonate plate 55, and then placed on a stainless steel plate S. The optical film F was placed on the surface of the polycarbonate film 50 such that the light diffusion layer of the optical film F faced the polycarbonate film 50. From a position 9 cm above the polycarbonate plate 55, an acrylic ball B having a weight of 159 g was allowed to freely fall. After that, the surfaces of the optical light diffusion layer and the polycarbonate film were observed both visually and using an optical microscope to evaluate the presence or absence of damage and the state of damage.

(c) Scratch Test

As in the falling ball test, the optical film F to be evaluated was sandwiched between the polycarbonate film 50 as the simulated light guide plate and the polycarbonate plate 55. A weight W (weight: 500 g, bottom surface: 2 cm×2 cm) was placed on the surface of the polycarbonate plate 55, and then the optical film F was pulled out in the horizontal direction. After that, the surfaces of the optical light diffusion layer and the polycarbonate film were observed both visually and using an optical microscope to evaluate the presence or absence of damage and the state of damage.

Table 3 shows the results of the evaluation of the light guide plate damage-production property obtained by (a) pressure test, (b) falling ball test, and (c) scratch test. The tests were evaluated according to the following criteria.

A . . . No damage observed (satisfactory)

B . . . Very slight damage observed (satisfactory)

C . . . Slight damage observed (satisfactory)

D . . . Severe damage observed (unsatisfactory)

<Overall Evaluation>

Excellent . . . A only (satisfactory)

Good . . . A or B only (satisfactory)

Fair . . . C present (satisfactory)

Poor . . . D present (unsatisfactory)

TABLE 3

Test for evaluating light guide plate damage-production property

|  | Pressure test | Falling ball test | Scratch test | Overall evaluation |
|---|---|---|---|---|
| Example 1 | A | A | A | Excellent |
| Example 2 | A | A | A | Excellent |
| Example 3 | B | B | B | Good |
| Example 4 | B | B | B | Good |
| Example 5 | A | A | A | Excellent |
| Example 6 | B | B | B | Good |
| Example 7 | B | B | B | Good |
| Example 8 | B | B | B | Good |
| Example 9 | C | C | C | Fair |
| Example 10 | B | C | C | Fair |
| Example 11 | C | C | C | Fair |
| Example 12 | C | C | C | Fair |
| Example 13 | C | C | C | Fair |
| Comparative Example 1 | B | D | D | Poor |
| Comparative Example 2 | B | D | D | Poor |

(Separation Evaluation)

The outermost surface of the light diffusion layer of the optical films obtained in the examples and the comparative examples was evaluated by a tape peel test. Specifically, a piece of Cellotape (registered trademark) (trade name, manufactured by Nichiban Co., Ltd.) was adhered to the surface of the sample and vigorously peeled off. Then, the tape was observed for the presence or absence of the light-diffusing particles adhered to the tape, and if no light-diffusing particles were adhered to the tape, it was determined that no separation occurred. The tests were evaluated according to the following criteria. Table 4 shows the results of the evaluation.

A . . . No particles were adhered to the tape (no separation). (satisfactory)

B . . . Small number of particles were adhered to the tape. (satisfactory)

C . . . Particles were adhered to the tape. (unsatisfactory)

TABLE 4

|  | Separation evaluation |
|---|---|
| Example 1 | A |
| Example 2 | A |
| Example 3 | A |
| Example 4 | A |
| Example 5 | A |
| Example 6 | A |
| Example 7 | A |
| Example 8 | A |
| Example 9 | B |
| Example 10 | B |
| Example 11 | A |
| Example 12 | B |
| Example 13 | B |
| Comparative Example 1 | C |
| Comparative Example 2 | C |

(Haze Measurement)

Haze values of the optical films obtained in the examples and the comparative examples were measured by using a haze meter (turbidimeter) NDH-2000 (trade name, manufactured by Nippon Denshoku Industries Co., Ltd.). A target haze value was set to 38% for the evaluation. Table 5 shows the results of the evaluation. The tests were evaluated according to the following criteria.

Excellent . . . Target value (38%) achieved (satisfactory)

Good . . . Within ±5 of target value (38%) (satisfactory)

TABLE 5

|  | Haze (%) | Evaluation |
|---|---|---|
| Example 1 | 38 | Excellent |
| Example 2 | 43 | Good |
| Example 3 | 38 | Excellent |
| Example 4 | 43 | Good |
| Example 5 | 33 | Good |
| Example 6 | 38 | Excellent |
| Example 7 | 38 | Excellent |
| Example 8 | 38 | Excellent |
| Example 9 | 43 | Good |
| Example 10 | 43 | Good |
| Example 11 | 38 | Excellent |
| Example 12 | 43 | Good |
| Example 13 | 43 | Good |
| Comparative Example 1 | 38 | Excellent |
| Comparative Example 2 | 38 | Excellent |

As seen from the evaluation results in Tables 3 to 5, the optical film of Example 1 achieved the best results in both the light guide plate damage-production property evaluation and the separation evaluation, and had the haze value matching the target value. In the optical film of Example 6, due to a large average particle size of 10 μm of the light-diffusing particles, very slight damage was observed in the evaluation of the light guide plate damage-production property. In the optical film of Example 2, an average value of the thickness for the binder resin covering the highest part of the protruded portion of the light-diffusing particles is 1.5 μm, and thus the haze was high and close to the tolerance limit. On the other hand, in the optical film of Example 3, because the thickness of the binder resin covering the highest part of the protruded portion of the light-diffusing particle has 30 nm on average, that is thin, very slight damage was observed in the evaluation of the light guide plate damage-production property.

INDUSTRIAL APPLICABILITY

The present disclosure provides an optical film, and an optical barrier film and a backlight unit including the optical film. The optical film is such that the risk of a light diffusion layer damaging the second member when in contact with the light diffusion layer and the risk of separation of light-diffusing particles are reduced.

REFERENCE SIGNS LIST

10 . . . Optical film; 12 . . . First film substrate; 12a . . . Second film substrate; 12b . . . Third film substrate; 14 . . . Light diffusion layer; 14A . . . Uneven surface; 14C . . . Plane determined by average thickness of light diffusion layer; 16 . . . Binder resin; 18 . . . light-diffusing particles; 20, 20A, 20B, 20C . . . Optical barrier film; 20F, 20G . . . Uneven surface; 22, 22a, 22b . . . Barrier composite layer; 24a, 24b . . . Barrier layer; 26a, 26b . . . Adhesive layer; 30 . . . Color conversion film; 32 . . . Color conversion layer; 40 . . . Backlight unit; 42 . . . Light source; 44 . . . Reflection plate; 46 . . . Light guide plate.

What is claimed is:

1. An optical film, comprising:
   a first film substrate; and
   a light diffusion layer that is formed on the first film substrate, wherein:
   the light diffusion layer contains a binder resin and light-diffusing particles;
   of the light-diffusing particles, 10% or more by number of the light-diffusing particles form an uneven structure on a surface of the light-diffusing layer by the 10% or more of the light-diffusing particles protruding further outward than a surrounding area not containing any light-diffusing particles; and
   of the light diffusing particles which cause the binder resin to be protruded and have a protruded portion, 90% or more by number of the protruded portion of light-diffusing particles is covered by the binder resin; wherein the light-diffusing particles are urethane particles; and wherein:
   in the binder resin that covers the protruded portion of the light-diffusing particles, a thickness of the binder resin that covers a highest part of the protruded portion of the light-diffusing particles in a direction perpendicular to a plane determined by a boundary surface between the first film substrate and the light diffusion layer is in the range of 50 nm or more and 1 μm or less on average.

2. The optical film of claim 1, wherein an average value of a height of the protruded portion of the light-diffusing particles from a plane determined by an average thickness of the light diffusion layer having the uneven structure is in the range of 10% or more and less than 50% of an average particle size of the light-diffusing particles in the light diffusion layer.

3. The optical film of claim 1, wherein an average particle size of the light-diffusing particles in the light diffusion layer is in the range of 0.5 μm or more and 10 μm or less.

4. The optical film of claim 1, wherein the light diffusion layer has a surface resistivity of $1.0 \times 10^{13}$ Ω/□ or less.

5. An optical barrier film, comprising a surface comprising a second film substrate including an inorganic oxide layer and a surface where the light diffusion layer is formed are on opposite sides of the first film substrate included in the optical film of claim 1 and the second film substrate is bonded to the first film substrate.

6. A backlight unit comprising the optical barrier film of claim 5.

7. The optical film of claim 1, wherein an average particle size of the light-diffusing particles in the light diffusion layer is from 2.5 μm to 3.5 μm.

8. The optical film of claim 1, wherein an average particle size of the light-diffusing particles in the light diffusion layer is from 10 μm to 15 μm.

* * * * *